US012559205B2

(12) United States Patent
Shotwell et al.

(10) Patent No.: US 12,559,205 B2
(45) Date of Patent: Feb. 24, 2026

(54) CANOPY EXTENSION SYSTEM

(71) Applicant: Lippert Components, Inc., Elkhart, IN (US)

(72) Inventors: John Shotwell, Edwardsburg, MI (US); Thomas F. Ward, Downingtown, PA (US); Justin Boggs, Elkhart, IN (US); Matthew Hess, Goshen, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 650 days.

(21) Appl. No.: 17/971,995

(22) Filed: Oct. 24, 2022

(65) Prior Publication Data

US 2023/0125631 A1     Apr. 27, 2023

Related U.S. Application Data

(60) Provisional application No. 63/270,669, filed on Oct. 22, 2021.

(51) Int. Cl.
B63B 17/02     (2006.01)
G01S 7/02     (2006.01)
(52) U.S. Cl.
CPC .............. B63B 17/02 (2013.01); G01S 7/027 (2021.05)

(58) Field of Classification Search
CPC .......... B63B 17/02; B63B 34/00; G01S 7/027
See application file for complete search history.

(56) References Cited

U.S. PATENT DOCUMENTS

| | | | |
|---|---|---|---|
| 8,752,498 B1 | 6/2014 | Schwindaman et al. | |
| 11,046,394 B1 * | 6/2021 | Ritchel | ................... B63B 17/02 |
| 11,667,353 B2 * | 6/2023 | Ward | ..................... B63B 17/02 |
| | | | 114/361 |
| 11,919,609 B2 * | 3/2024 | Mazzarelli | .............. B63B 17/02 |
| 2021/0323639 A1 | 10/2021 | Ward et al. | |

FOREIGN PATENT DOCUMENTS

GB          2 392 881          1/2006

* cited by examiner

*Primary Examiner* — Anthony D Wiest
(74) *Attorney, Agent, or Firm* — NIXON & VANDERHYE P.C.

(57) ABSTRACT

A canopy extension system is cooperable with a support structure and includes a canopy arm securable pivotably to the support structure and a roller arm securable pivotably to the support structure. A roller is secured on the roller arm. A canopy is connected to the canopy arm at a distal end, is connected adjacent the support structure at a proximal end, and is connected to the roller between the distal end and the proximal end. A variation connects the canopy arm to a radar arch or the like with a spring-biased secondary canopy arm.

18 Claims, 17 Drawing Sheets

CANOPY EXTENSION SYSTEM

CROSS-REFERENCES TO RELATED APPLICATIONS

This application claims the benefit of U.S. Provisional Patent Application No. 63/270,669, filed Oct. 22, 2021, the entire content of which is herein incorporated by reference

STATEMENT REGARDING FEDERALLY SPONSORED RESEARCH OR DEVELOPMENT (NOT APPLICABLE)

BACKGROUND

The invention relates to a bimini top and, more particularly, to a canopy roller and support system cooperable with a bimini arch or functional as an independent bimini top.

In recreational boating, the so-called "bimini top" is a convertible cover erected on the deck of the boat and made to be deployed at an elevation comfortably above the heads of the passengers. Drawing its name from the Bimini islands in the Bahamas where it was first employed by boaters to provide desired shade from the strong rays of the tropical sun, the standard type of bimini top generally includes a flexible canvas material secured to a foldable support frame that is erected across the deck and is pivotally attached. These standard types of foldable bimini tops can be raised when needed or lowered into a substantially flat position on the deck when not in use or when an overhead obstruction may otherwise require it to be lowered.

Existing framework generally used to construct present bimini top installations includes a system of poles or like rigid members mounted to the port and starboard sides of the boat and made to extend across the deck at a sufficient height level to support the canvas top above the occupants. As currently arranged and implemented, these pole systems typically have separate front and rear pole members over which the canvas top is extended and, depending on the length of the top from fore to aft, one or more additional pole members between the front and rear poles to firmly support the intermediate section of the top. The pole members tend to obstruct a person on board from reaching out over the side of the boat when fishing, docking or mooring the boat and further present an obstacle in boarding and loading equipment onto the deck. While these and other similarly devised implementations of convertible bimini tops have been effective in providing suitable shade protection from the sun when needed, they have not satisfactorily resolved the problems of obstructions and obstacles caused in and around the boat deck by their supporting framework.

Separately, radar arches have become quite popular and are attached to, and upwardly extend from, the deck or superstructure (such as a flybridge) of boats. These radar arches are useful for attaching antennas and radar systems thereto. Deck lights and stereo speakers are also typically found connected to these radar arches. However, despite their relatively high expense, very little additional utility has been made of radar arches. In fact, on many boats which include both convertible tops and radar arches, the two are completely free standing one to another thus having the appearance of a discontinuity of design.

SUMMARY

According to the described embodiments, a canopy framework supports a roller that is attached at the midpoint of the canopy length and unfurls the canopy in both directions as the framework is actuated and continues until the canopy is fully tensioned in a single layer between its two ends and reaches full extension. In some embodiments, the canopy extension system is installed and supported on a radar arch.

In another embodiment, a free-hanging canopy may be attached at the midpoint of its length by a secondary canopy arm that is pivotally attached to framework installed on a bimini arch. The extended canopy is fully tensioned in a single layer between its two ends with the secondary canopy arm spring-biased into position.

Both arrangements create an extended canopy that provides shade for a greater area over the boat deck.

Although the various embodiments will be described in conjunction with a radar arch, the structural components may be cooperable with an alternative support or configured as an independent bimini top.

In an exemplary embodiment, a canopy extension system cooperable with a support structure includes a primary canopy arm securable pivotally to the support structure, a secondary canopy arm pivotably secured to the primary canopy arm, a spring connected between the primary canopy arm and the secondary canopy arm, and a canopy connected to the canopy arm at a distal end, connected adjacent the support structure at a proximal end, and connected to the secondary canopy arm between the distal end and the proximal end.

The secondary canopy arm may be pivotably secured to the primary canopy arm at or near a midpoint of the primary canopy arm. The spring may be connected to the primary canopy arm between the midpoint of the primary canopy arm and the support structure, and the spring may be connected to the secondary canopy arm at a position spaced from where the secondary canopy arm is secured to the primary canopy arm. The secondary canopy arm may be connected to the canopy at or near a midpoint of a canopy length.

The spring may be configured to bias the secondary canopy arm toward an extended position.

The secondary canopy arm may be a U-shaped hoop connected at ends thereof to the support structure and connected in a middle thereof to the canopy.

The extension system may also include a drive mechanism coupled with the primary canopy arm and configured to displace the primary canopy arm between a retracted position and an extended position. The drive mechanism may be motorized.

The extension system may also include a fixed bar securable to the support structure, where the proximal end of the canopy may be connected to the fixed bar.

The extension system may include a strut that is selectively connectable between the primary canopy arm and the secondary canopy arm when the primary canopy arm is pivoted to an extended position. In this context, the primary canopy arm may include a clip, and an end of the strut may be detachable from the secondary canopy arm and securable to the primary canopy arm via the clip.

When the primary canopy arm is disposed in a fully retracted position, the canopy may drape downward from the primary and secondary canopy arms to be gathered for storage.

In another exemplary embodiment, a radar arch in combination with a canopy extension system includes a pair of radar arch legs securable on a cabin, a radar arch top extending from ends of the pair of radar arch legs, a primary canopy arm pivotably secured to the radar arch legs, a secondary canopy arm pivotably secured to the primary canopy arm, a spring connected between the primary canopy arm and the secondary canopy arm, and a canopy connected to the canopy arm at a distal end, connected adjacent the radar arch at a proximal end, and connected to the secondary canopy arm between the distal end and the proximal end.

The radar arch legs are curved, and the primary canopy arm may be curved corresponding to the radar arch legs. Additionally, the secondary canopy arm may be curved corresponding to the radar arch legs.

In another exemplary embodiment, a canopy extension system attachable to a radar arch includes a primary canopy arm pivotably secured on the radar arch, and a secondary canopy arm pivotably secured on one of the radar arch and the primary canopy arm, where the primary canopy arm and the secondary canopy arm are pivotable together between a retracted position and an extended position. A fixed bar is secured to the radar arch, and a canopy is connected between the fixed bar and the canopy arm through the secondary canopy arm. A motorized drive system connected to the primary canopy arm is configured to displace the primary canopy arm and the secondary canopy arm between the retracted position and the extended position. In some embodiments, the secondary canopy arm may be a roller arm pivotably secured to the radar arch, where the canopy extension system further includes a roller secured on the roller arm, and where the canopy is connected between the fixed bar and the primary canopy arm through the roller.

In an exemplary embodiment, a canopy extension system cooperable with a support structure includes a canopy arm securable pivotably to the support structure, a roller arm securable pivotably to the support structure, a roller secured on the roller arm, and a canopy connected to the canopy arm at a distal end, connected adjacent the support structure at a proximal end, and connected to the roller between the distal end and the proximal end.

The canopy arm and the roller arm may be pivotable between a retracted position and an extended position, and the roller may be spring-loaded to wind the canopy onto the roller as the canopy arm is pivoted to the retracted position.

The canopy extension system may also include a drive mechanism coupled with the canopy arm and configured to displace the canopy arm between a retracted position and an extended position. The drive mechanism may be motorized.

The canopy extension system may also include a fixed bar securable to the support structure, wherein the proximal end of the canopy may be connected to the fixed bar.

The canopy may include an integrated bead across a width of the canopy, and the roller may include a receiving aperture along a length of the roller, where the integrated bead is secured in the receiving aperture. The canopy may include a proximal section that extends from the integrated bead to the proximal end and a distal section that extends from the integrated bead to the distal end, and the roller and canopy may be configured such that the proximal section and the distal section is wound onto the roller simultaneously.

The canopy may include a zipper system with a first zipper and a second zipper adjacent the distal end, and the canopy may be connected to the canopy arm by looping over the canopy arm and connecting the first zipper to the second zipper. The zipper system may include a third zipper adjacent the proximal end, and the first zipper may be securable to the third zipper when the canopy arm is pivoted to a retracted position to serve as a boot for the canopy.

The canopy extension system may also include a strut that may be selectively connectable between the canopy arm and the roller arm when the canopy arm is pivoted to an extended position. In this context, the canopy arm may include a clip, and the strut may be detachable from the roller arm and securable to the canopy arm via the clip.

In another exemplary embodiment, a radar arch in combination with a canopy extension system includes a pair of radar arch legs securable on a cabin, a radar arch top extending from ends of the pair of radar arch legs, a canopy arm pivotably secured to the radar arch legs, a roller arm pivotably secured to the radar arch legs, a roller secured on the roller arm, and a canopy connected to the canopy arm at a distal end, connected adjacent the radar arch at a proximal end, and connected to the roller between the distal end and the proximal end.

The radar arch legs may be curved, and the canopy arm may be curved corresponding to the radar arch legs. The roller arm may be curved corresponding to the radar arch legs. The radar arch and canopy extension system may also include a fixed bar securable to the radar arch legs, where the proximal end of the canopy may be connected to the fixed bar.

The radar arch and canopy extension system may also include a drive mechanism connected to each of the radar arch legs and coupled with the canopy arm, where the drive mechanism is configured to displace the canopy arm between a retracted position and an extended position. The drive mechanism may be motorized.

In yet another exemplary embodiment, a canopy extension system attachable to a radar arch includes a canopy arm pivotably secured on the radar arch, and a roller arm pivotably secured on the radar arch. The canopy arm and the roller arm are pivotable together between a retracted position and an extended position. A roller is secured on the roller arm, a fixed bar is secured to the radar arch, and a canopy is connected between the fixed bar and the canopy arm through the roller. A motorized drive system connected to the canopy arm is configured to displace the canopy arm and the roller arm between the retracted position and the extended position.

BRIEF DESCRIPTION OF THE DRAWINGS

These and other aspects and advantages will be described in detail with reference to the accompanying drawings, in which.

5

Figure 13:
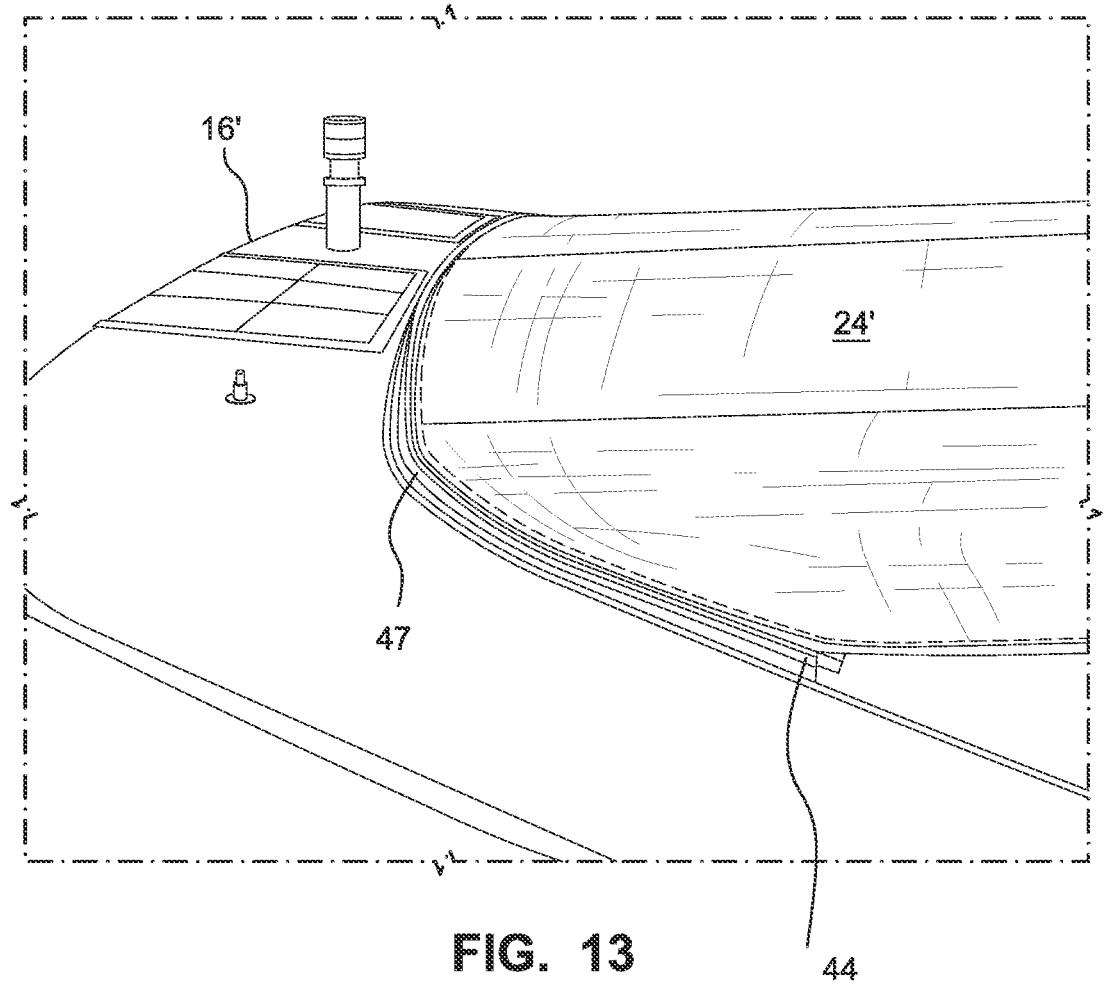
Figure 14:
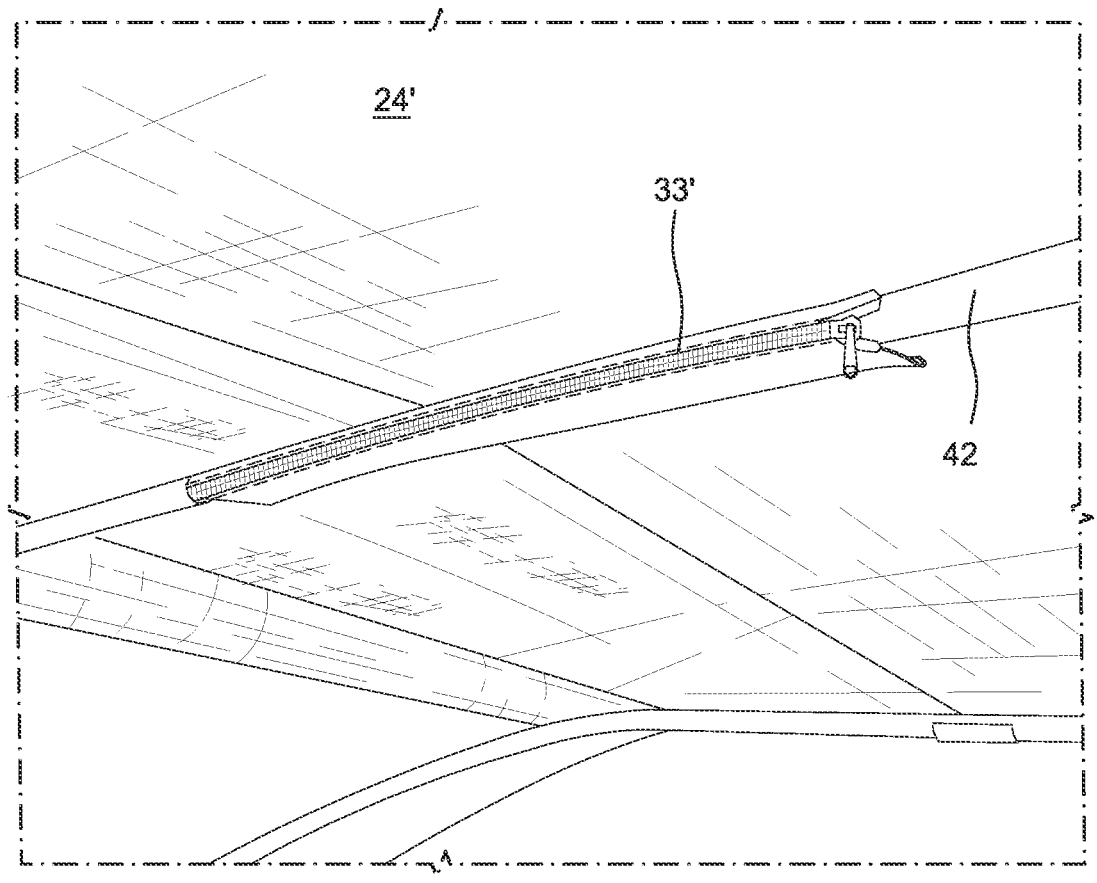
Figure 15:
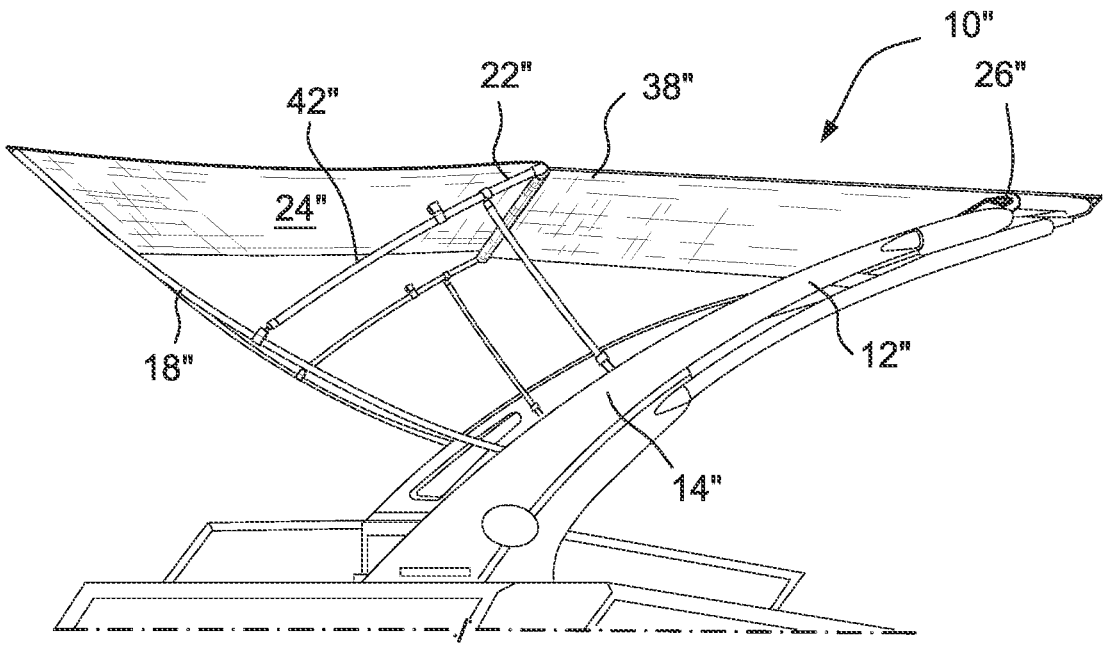
Figure 16:
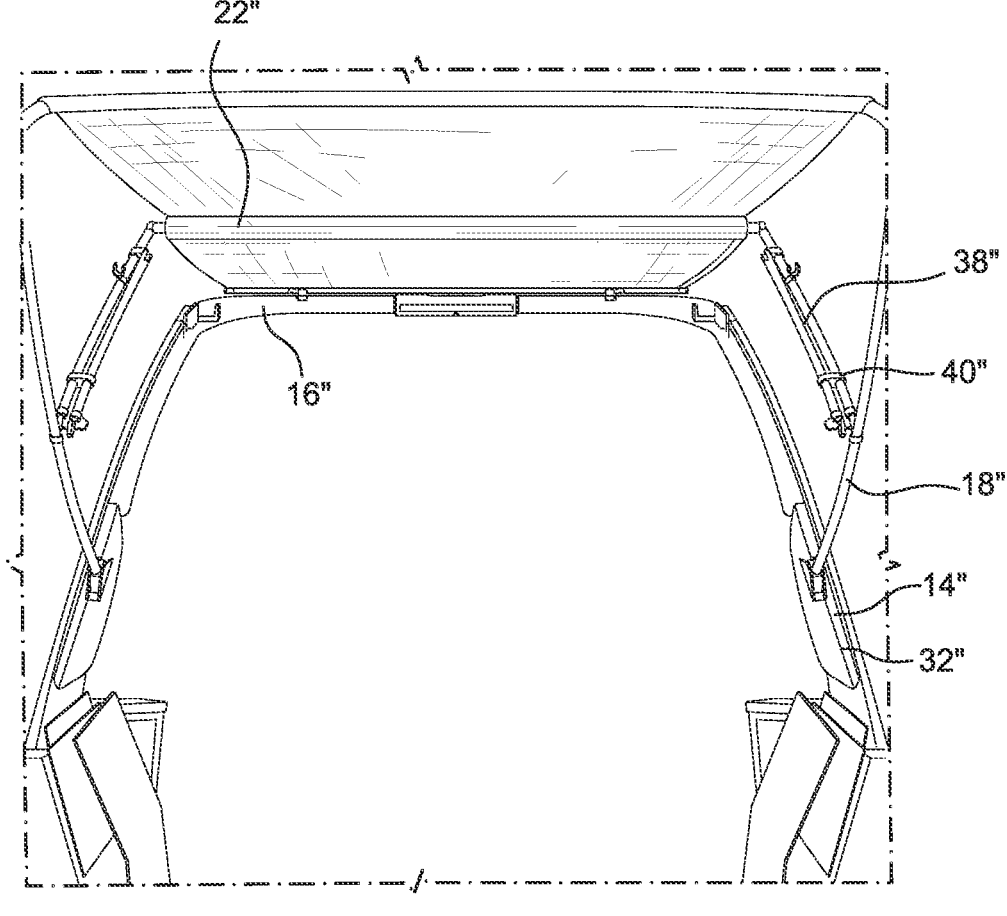

FIG. 13 is a close-up view of the canopy connection to the radar arch;

FIG. 14 is a close-up view of the canopy connection to the secondary canopy arm;

FIG. 15 shows an alternate embodiment of a bimini arch canopy extension system in a fully extended position;

FIG. 16 is a side perspective view of the system of FIG. 15; and

Figure 17:
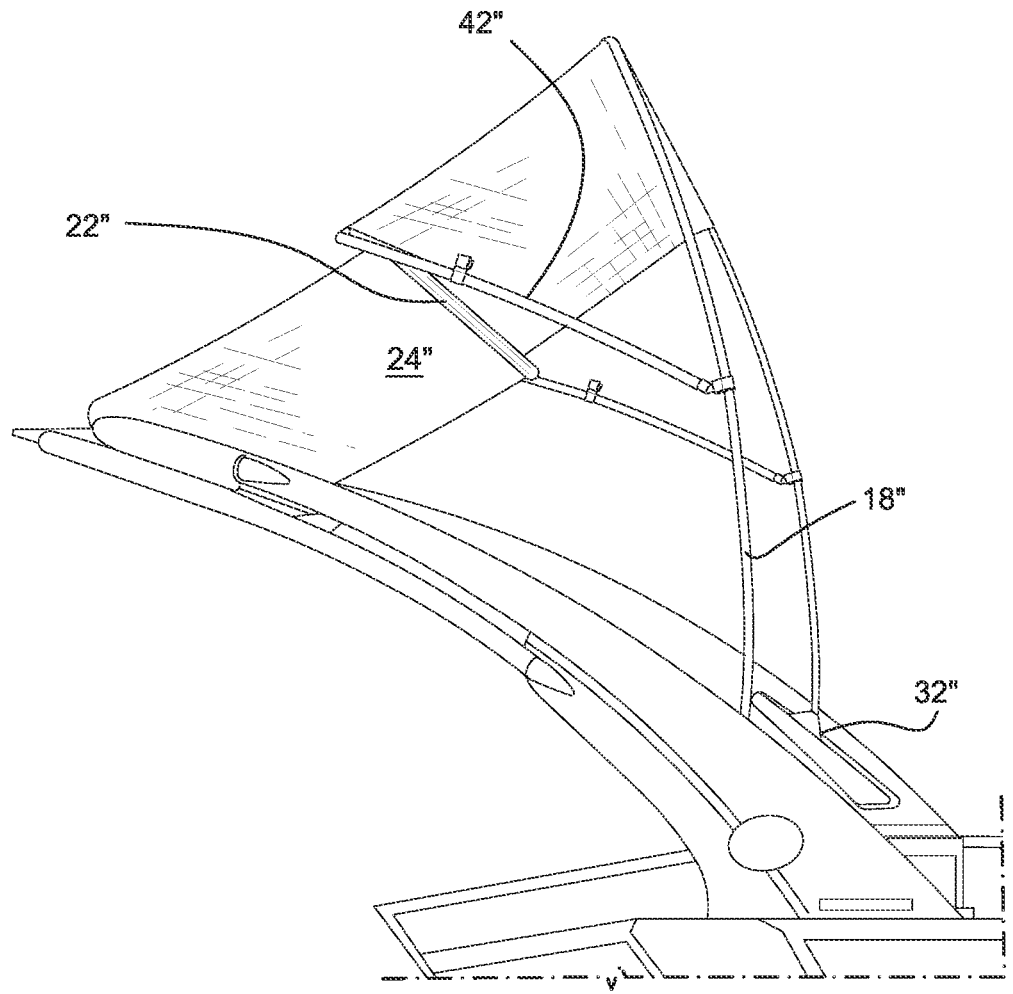

FIG. 17 shows the system of FIG. 15 in an interim position between the retracted position and the extended position.

DETAILED DESCRIPTION

Figure 1:
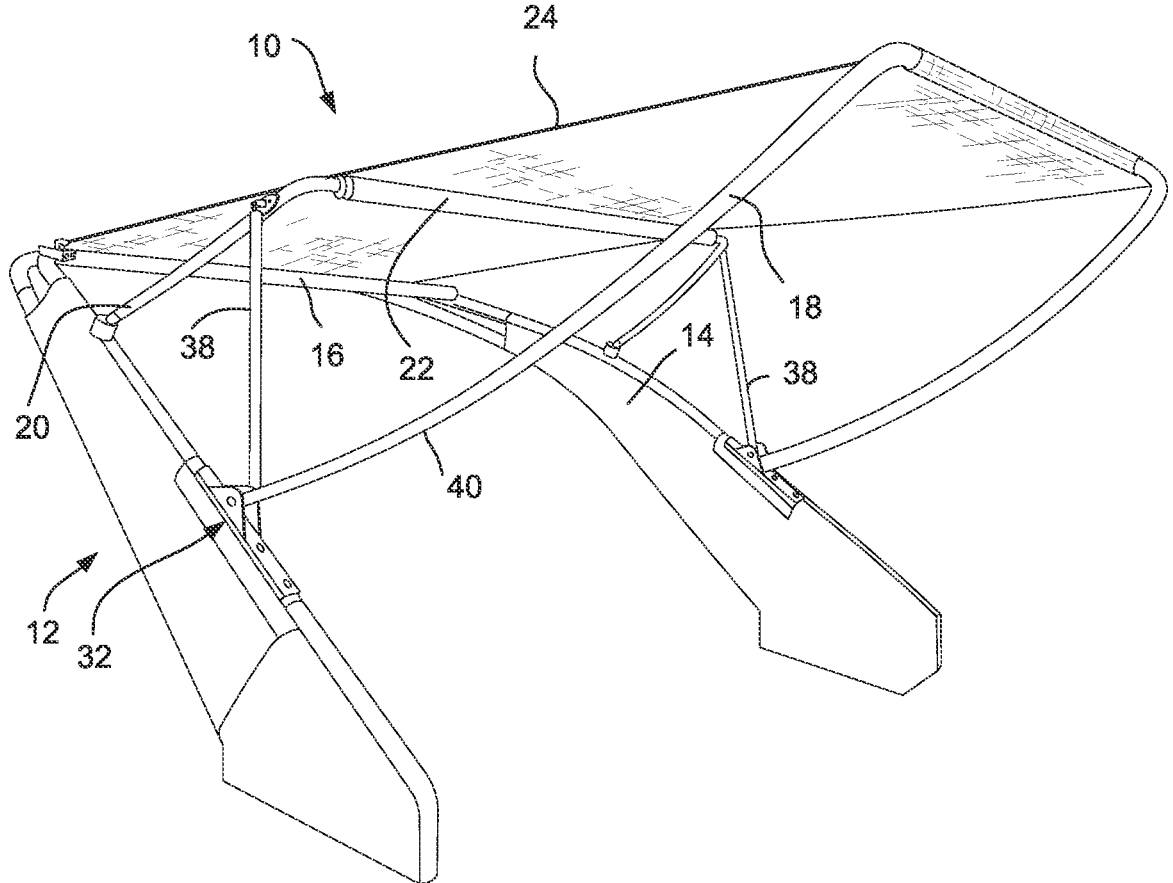
FIG. 1 shows the bimini arch canopy extension system in a fully extended position.
Figure 2:
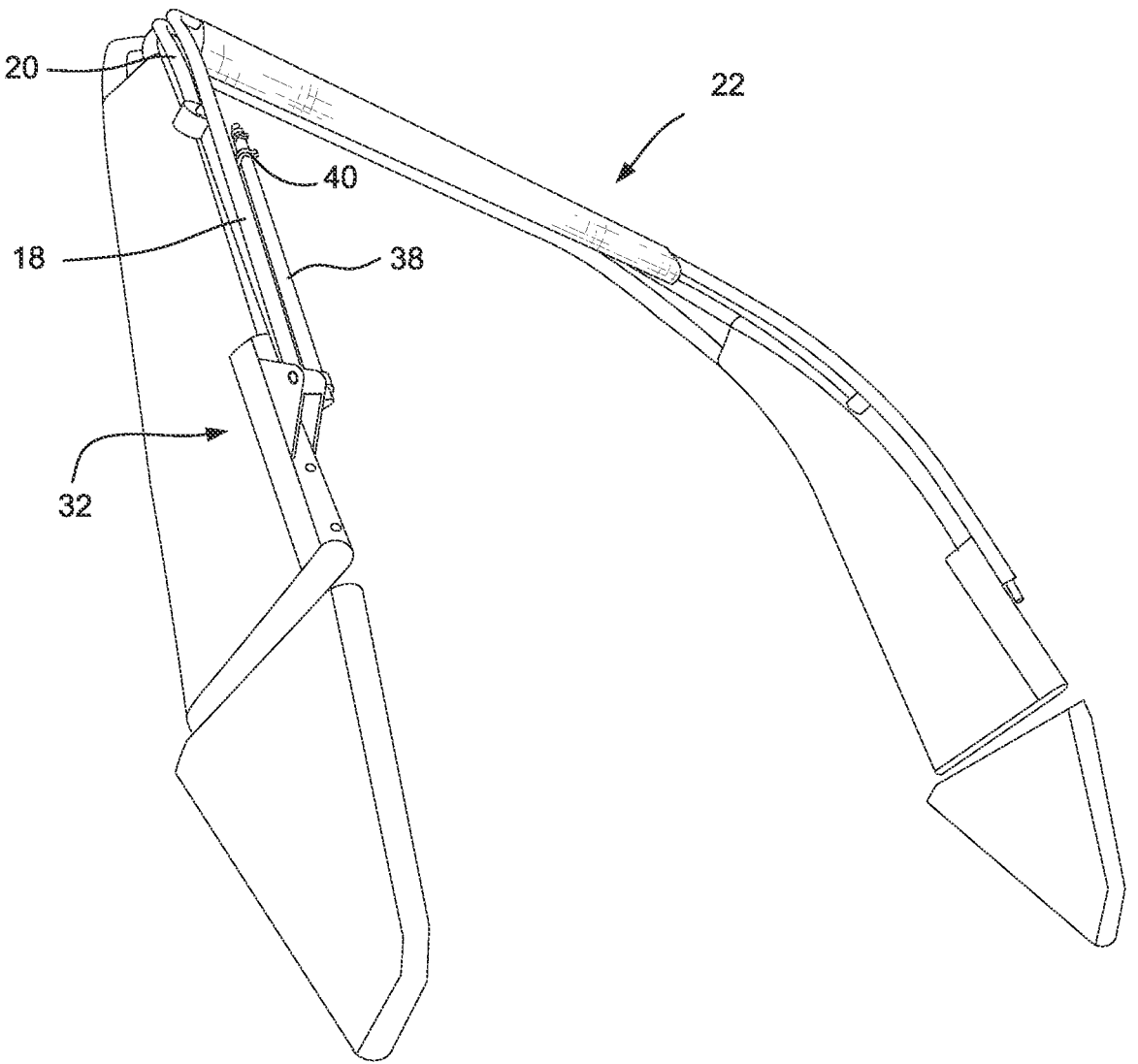
FIG. 2 shows the system in a fully retracted position.
Figure 3:
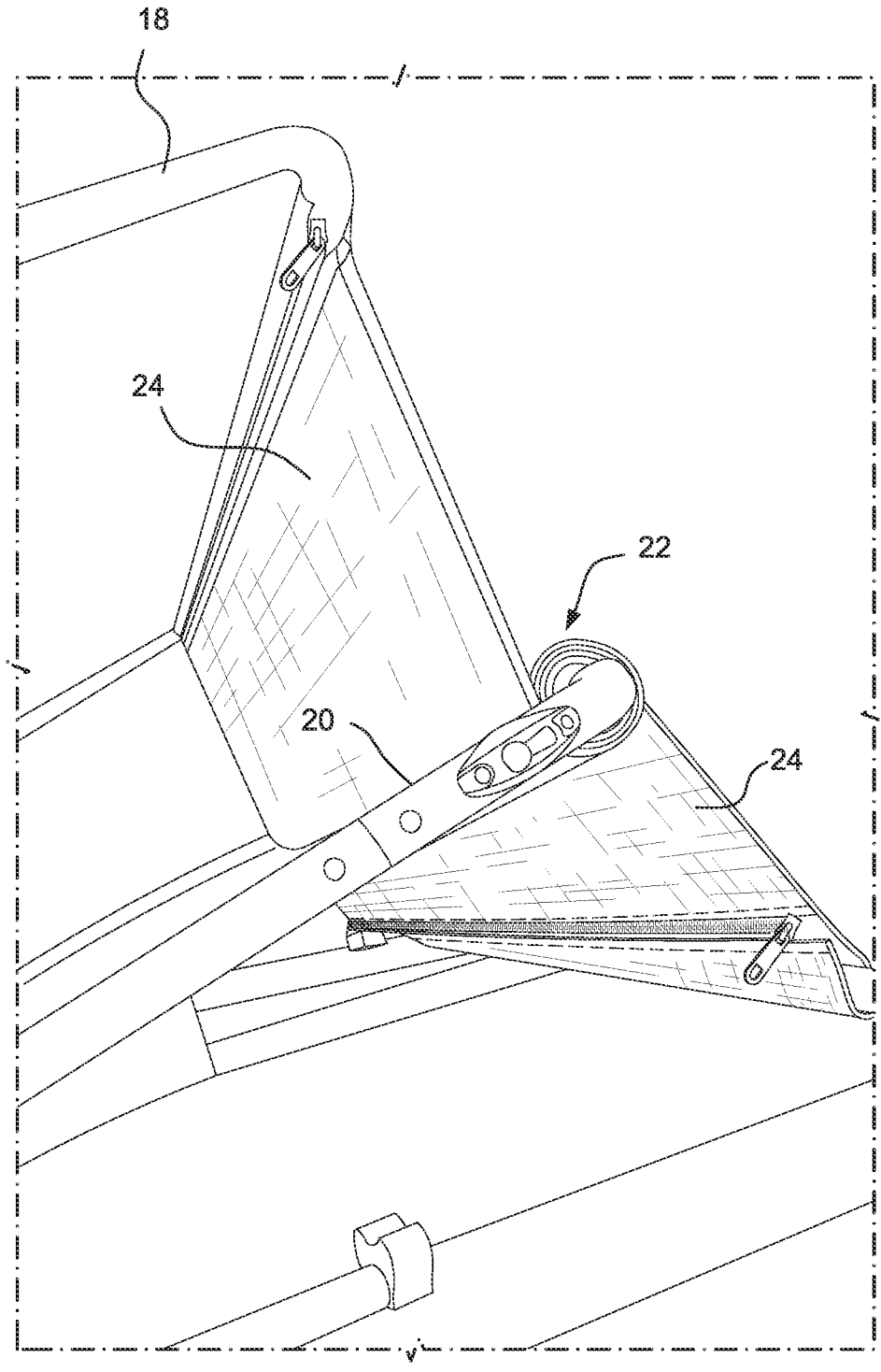
FIG. 3 shows the system in an interim position between the retracted position and the extended position.

FIGS. 1-3 show the canopy extension system 10 of the described embodiments secured on a radar arch 12. The radar arch 12 is exemplary, and the canopy extension system 10 could be cooperable with alternative support structure.

The radar arch 12 includes a pair of radar arch legs 14 securable on a cabin or boat deck. A radar arch top 16 extends from ends of the pair of radar arch legs 14.

The canopy extension system 10 includes a (primary) canopy arm 18 pivotably secured to the radar arch legs 14 (or other support structure). A roller arm 20 is also pivotably secured to the radar arch legs 14 (or other support structure). In the exemplary embodiment shown in FIG. 1, the roller arm 20 is spaced from the canopy arm 18 and positioned closer to the radar arch top 16. The canopy arm 18 and the roller arm 20 may be slightly curved to be nearly flush with the radar arch 12 when the system is in the retracted position. A roller 22 is secured on the roller arm 20. The roller 22 may be secured to the roller arm 20 in any suitable manner. In the embodiment shown, the roller 22 may be connected to the roller arm 20 such that the roller 22 may rotate with the rolling or unrolling of a canopy 24 independently from the pivotal movement of the roller arm 20 on either side of the roller 22.

Figure 6:
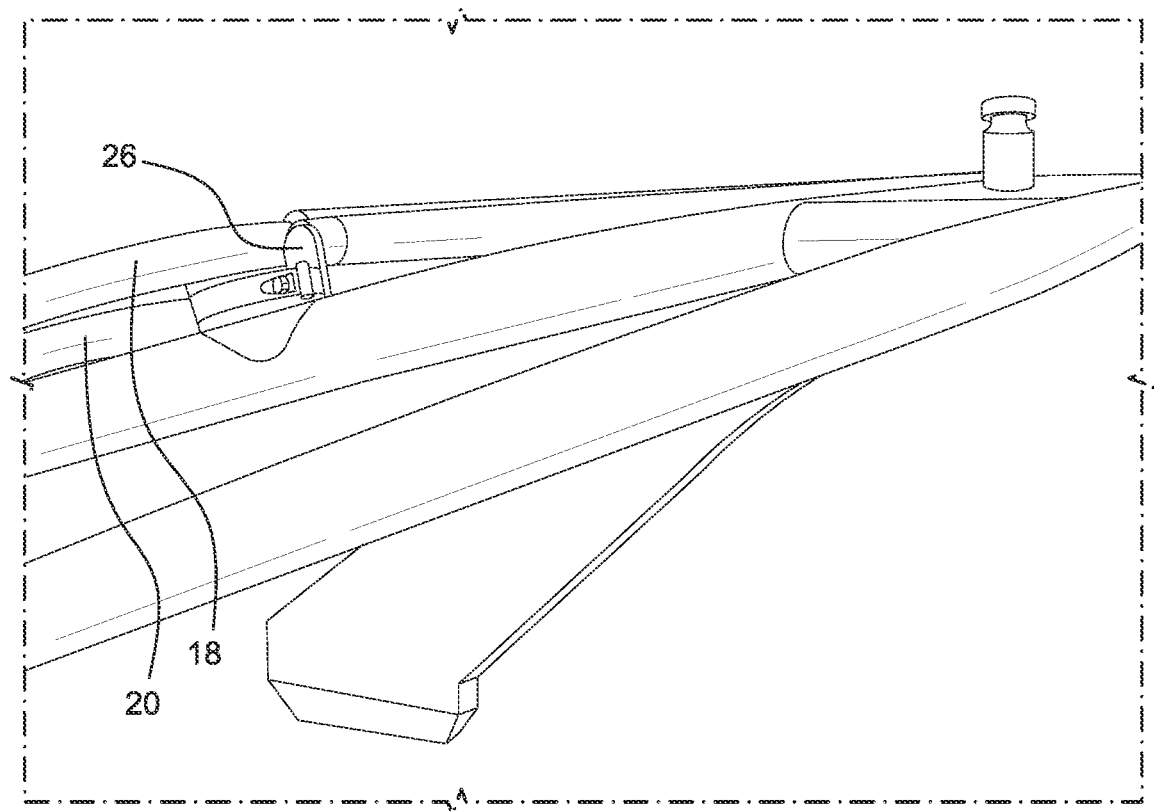
FIG. 6 is a close-up view of the canopy arm and the roller arm in the retracted position.

The canopy 24 is connected to the canopy arm 18 at a distal end of the canopy 24 and is connected adjacent the radar arch at a proximal end of the canopy 24. In some embodiments, the proximal end of the canopy 24 is connected to a fixed bar 26 secured across a top portion of the radar arch legs 14. See FIG. 6.

Figure 4:
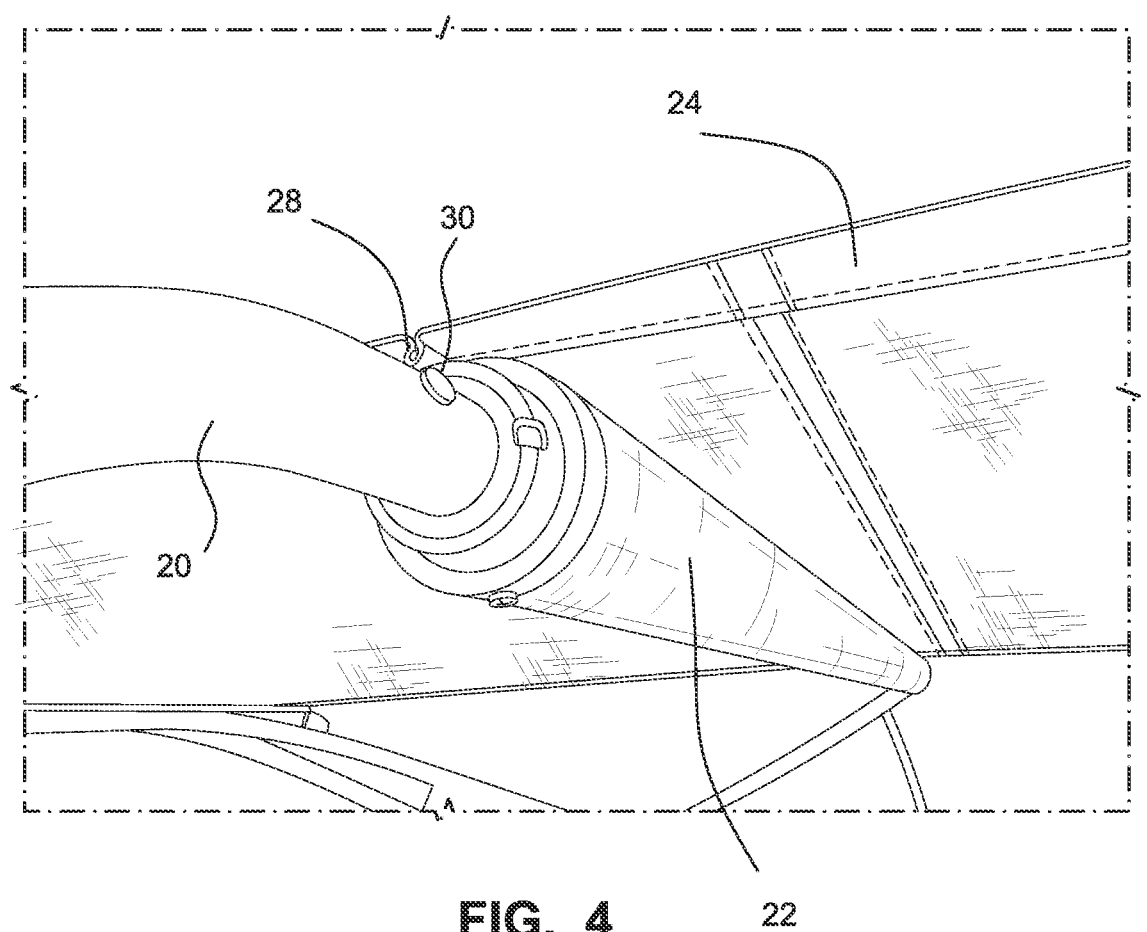
FIG. 4 is a close-up view of the roller arm, roller and canopy connected to the roller.

The canopy 24 is also connected to the roller 22 at a position between the proximal and distal ends of the canopy 24. With reference to FIG. 4, the canopy 24 may be provided with an integrated bead 28 that is received in a receiving aperture 30 in the roller 22. As shown, the integrated bead 28 extends across a width of the canopy 24, and the receiving aperture 30 extends across a length of the roller 22. The integrated bead 28 is secured in the receiving aperture 30. In an alternative embodiment, the roller arm 20 may be constructed of a continuous hoop without a roller. In such an embodiment, the hoop of the roller arm may still be attached to the midline of an extra-long canopy by any suitable method, and the construction allows the canopy to drape down and be contained in a boot in the retracted position.

A drive mechanism 32 is coupled with at least one end of the canopy arm 18, preferably both, and is configured to displace the canopy arm 18 between the retracted position shown in FIG. 2 and the extended position shown in FIG. 1. In some embodiments, the drive mechanism 32 is motorized. A suitable drive mechanism is the Schwindaman PWR-Arm actuator, which is described in U.S. Pat. No. 8,752,498, the contents of which are hereby incorporated by reference. Other actuation mechanisms could be used to displace the canopy arm 18 between the retracted and extended positions. Additionally, U-shaped brackets may be used for mounting the mechanism to a contoured surface of the radar arch, and the radar arch may optionally include an arch leg tilting mechanism. These aspects are described in U.S. patent application Ser. No. 17/234,124, the contents of which are hereby incorporated by reference.

Figure 5:
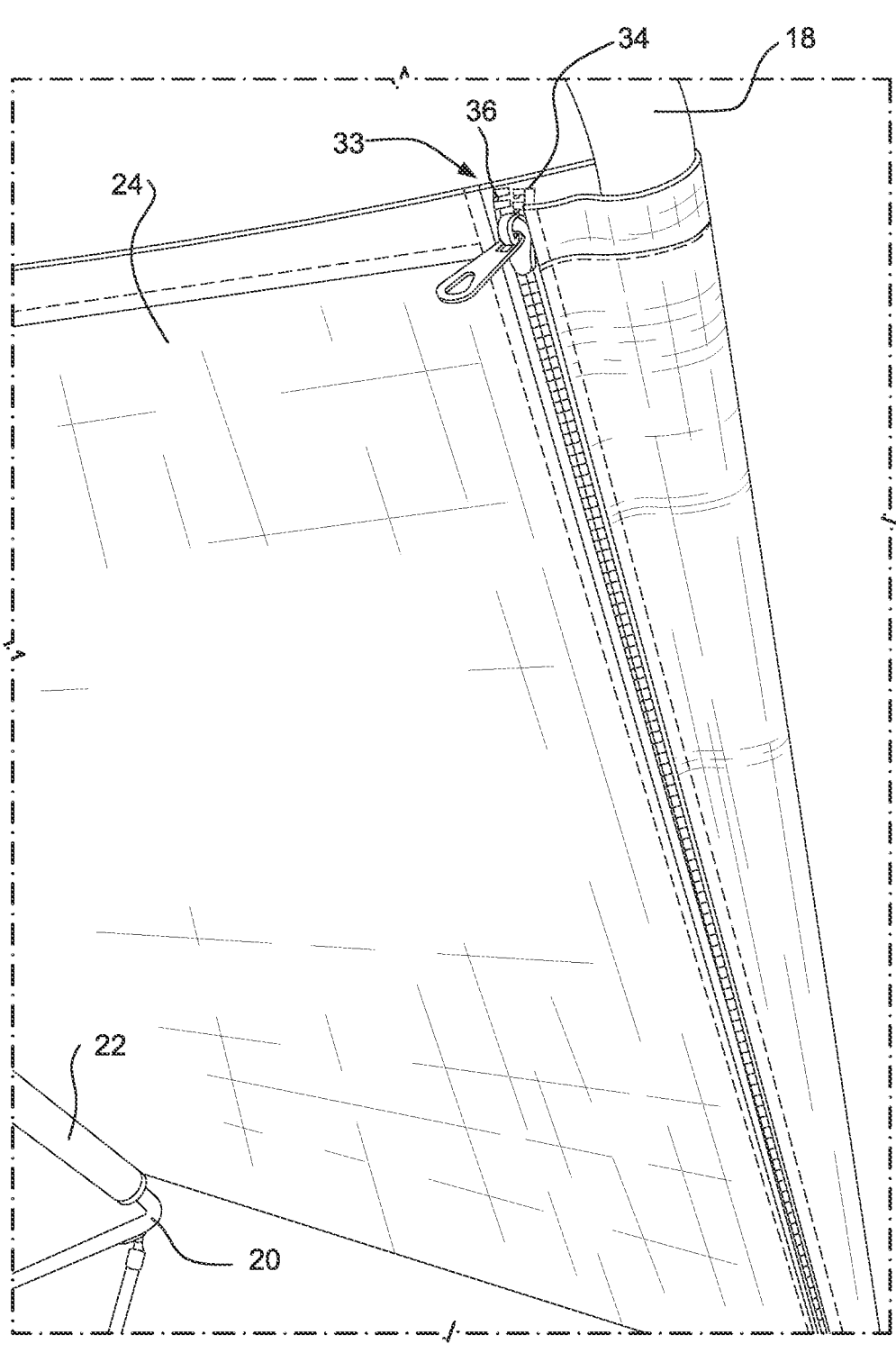
FIG. 5 is a close-up view showing the canopy connection to the canopy arm.

With reference to FIG. 5, the canopy 24 may include a zipper system 33 with a first zipper 34 and a second zipper 36 adjacent the distal end of the canopy 24. In some embodiments, the first zipper 34 may be disposed at the distal end of the canopy 24 with the second zipper 36 spaced slightly inward of the distal end. The canopy 24 is connected to the canopy arm 18 by looping the canopy over the canopy arm 18 and connecting the first zipper 34 to the second zipper 36. In the retracted position shown in FIGS. 2 and 6, the canopy arm 18 rests slightly beyond the roller arm 20 in close proximity to the fixed bar 26. As such, in the retracted position, the proximal and distal ends of the canopy 24 rest very close to each other, and the roller 22 between the two ends rests slightly below, but in tension with, the two ends. The canopy 24 remains tensioned and can be easily booted when not in use. In this context, the zipper system 33 may include a third zipper adjacent the proximal end, where the first zipper 34 is securable to the third zipper when the canopy arm 18 is pivoted to the retracted position to serve as a boot for the canopy 24.

With continued reference to FIG. 1, the canopy extension system 10 may also include one or more struts 38 that are selectively connectable between the canopy arm 18 and the roller arm 20 when the canopy arm 18 is pivoted to the extended position. The canopy arm 18 may be provided with a clip 40 or the like, where the strut 38 is detachable from the roller arm 20 and securable to the canopy arm 18 via the clip 40. FIG. 2 shows the strut 38 secured to the clip 40 on the canopy arm 18. The struts 38 can be secured to the canopy arm 18 in the retracted position, and the struts 38 may be released from the clip 40 and rotated into engagement with the roller arm 20 to help support the roller arm 20 when the system is in the extended position. In this embodiment, a distal end of the struts 38 may contain a knob or another locking feature that snaps into a receiving feature integrated into the roller arm 20 near the location of the roller 22. When retracting the system, the struts 38 are released from the roller arm 20 and returned to the clips 40 on the canopy arm 18.

The roller 22 is preferably spring-biased so that as the system is displaced from the extended position toward the retracted position, the roller 22 rolls up the canopy 24 from both ends by action of the spring. As noted, the roller 22 attaches to a midpoint of the canopy 24. FIG. 3 shows the system in a position between the retracted position and the extended position. As the drive mechanism 32 begins to pivot the canopy arm 18, the distal end of the canopy 24 unrolls off of the roller 22 and begins to pull the roller arm 20 toward the extended position. The canopy 24 is rolled onto and off the roller 22 in both directions. That is, the integrated bead 28 of the canopy 24 engaging the receiving aperture 30 in the roller causes the proximal and distal ends of the canopy to overlap and wind/unwind around the roller 22 as the system is retracted or extended. As the canopy arm 18 continues to be actuated and extended, the canopy 24 continues to unroll in both directions, and the roller arm 20 with the roller 22 also continues to extend. This continues until the canopy 24 is fully extended as shown in FIG. 1 in a flat singular layer that is tensioned between the fixed bar 26 at the proximal end of the canopy and the canopy arm 18 with the zippered hoop at the distal end of the canopy 24.

When retracting the system, since the roller 22 is spring-loaded, the roller 22 rotates to roll both sides of the canopy 24 onto the roller 22. The retraction continues and actuates the canopy arm 18 and the roller arm 20 rearward until they return to the retracted position (as shown in FIG. 2).

The bimini arch canopy extension system of the described embodiment creates an extended canopy that provides shade for a greater area on a boat deck. A greater area can be covered by securing the roller at a midpoint of the canopy so that the roller unfurls canopy in both directions as the system is actuated to an extended position. The roller automatically winds the canopy from both ends as the system is retracted.

FIGS. 7-14 show an alternate embodiment of a canopy extension system 10' secured on a radar arch 12'. As mentioned with the previous embodiments, the canopy extension system 10' could be cooperable with alternative support structures. The radar arch 12' includes a pair of radar arch legs 14' securable on a cabin or boat deck. A radar arch top 16' extends from ends of the pair of radar arch legs 14'.

The canopy extension system 10' includes a (primary) canopy arm 18' pivotably secured to the radar arch legs 14' (or other support structure). The canopy arm 18' may be pivotally connected to the radar arch legs 14' via drive mechanism 32' on at least one arch leg. The drive mechanism 32' is coupled with at least one end of the canopy arm 18', preferably both, and is configured to displace the canopy arm 18' between retracted and extended positions. The drive mechanism 32' is similar to the drive mechanism 32 described in respect of the first embodiment.

A canopy 24' is connected to the canopy arm 18' at a distal end of the canopy 24' and is connected adjacent the radar arch 12' at a proximal end of the canopy 24'. As seen in FIG. 13, the proximal end of the canopy 24' may be connected directly to the radar arch top 16' via a bead or retaining ridge 44 at the end of the canopy material to be received in a channel 47 at the radar arch top 16'. The proximal end of the canopy 24' may be attached to the structure by any other suitable method. The distal end of the canopy 24' may be connected to the canopy arm 18' by a zipper system 33' as described previously.

Figure 7:
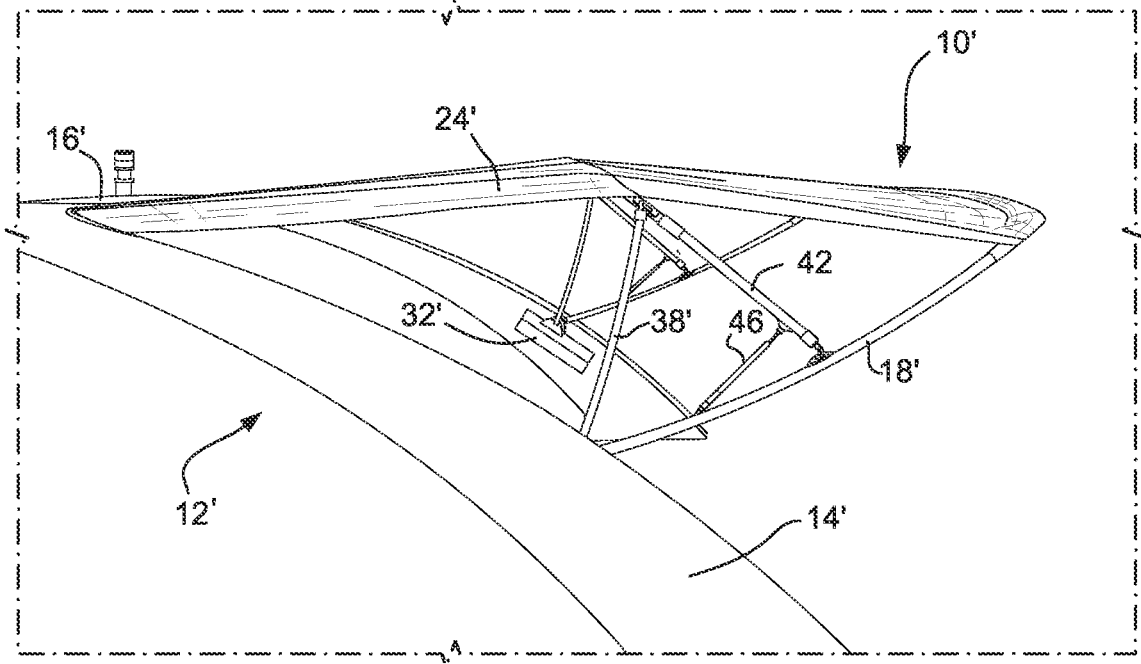
FIG. 7 shows an alternate embodiment of a bimini arch canopy extension system in a fully extended position.
Figure 8:
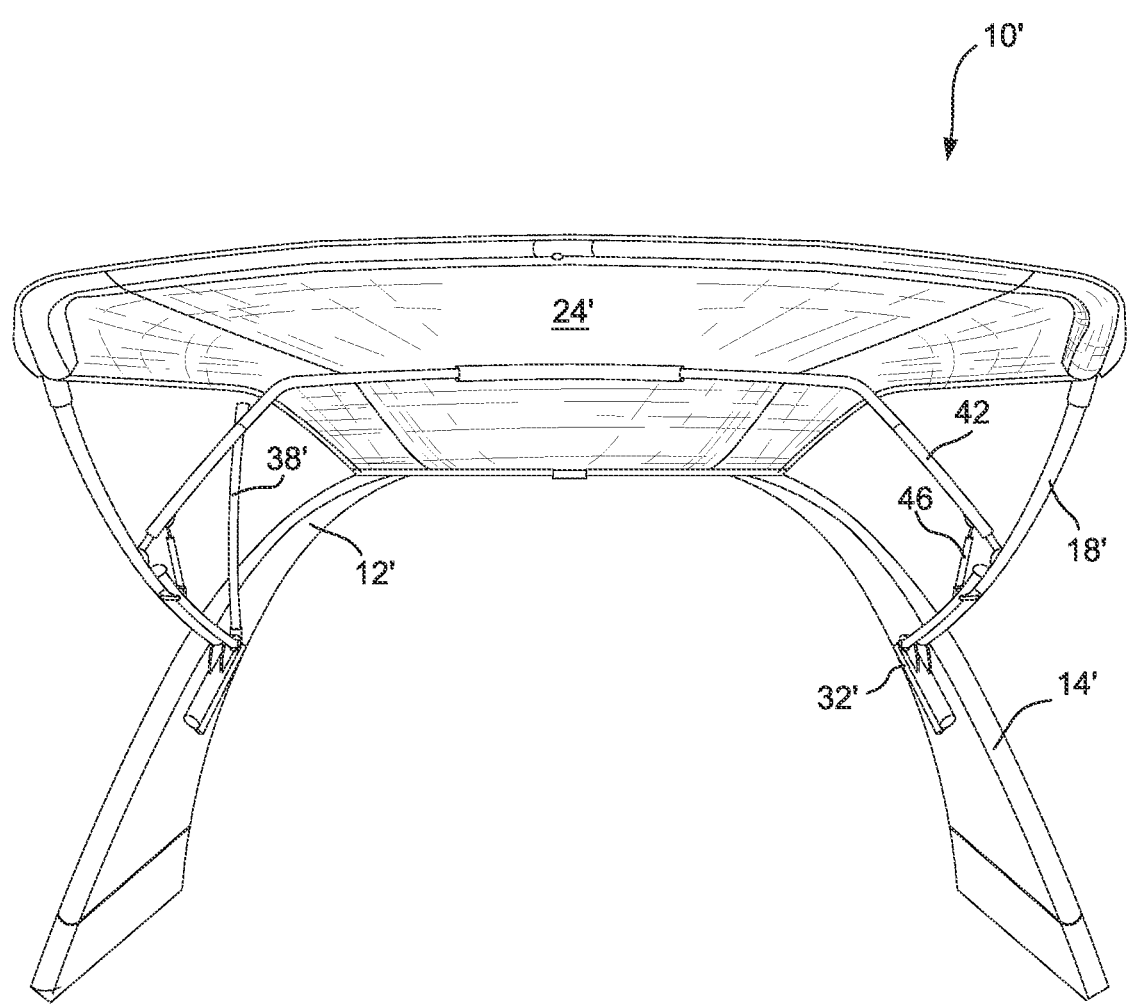
FIG. 8 is a front view of the system of FIG. 7.
Figure 9:
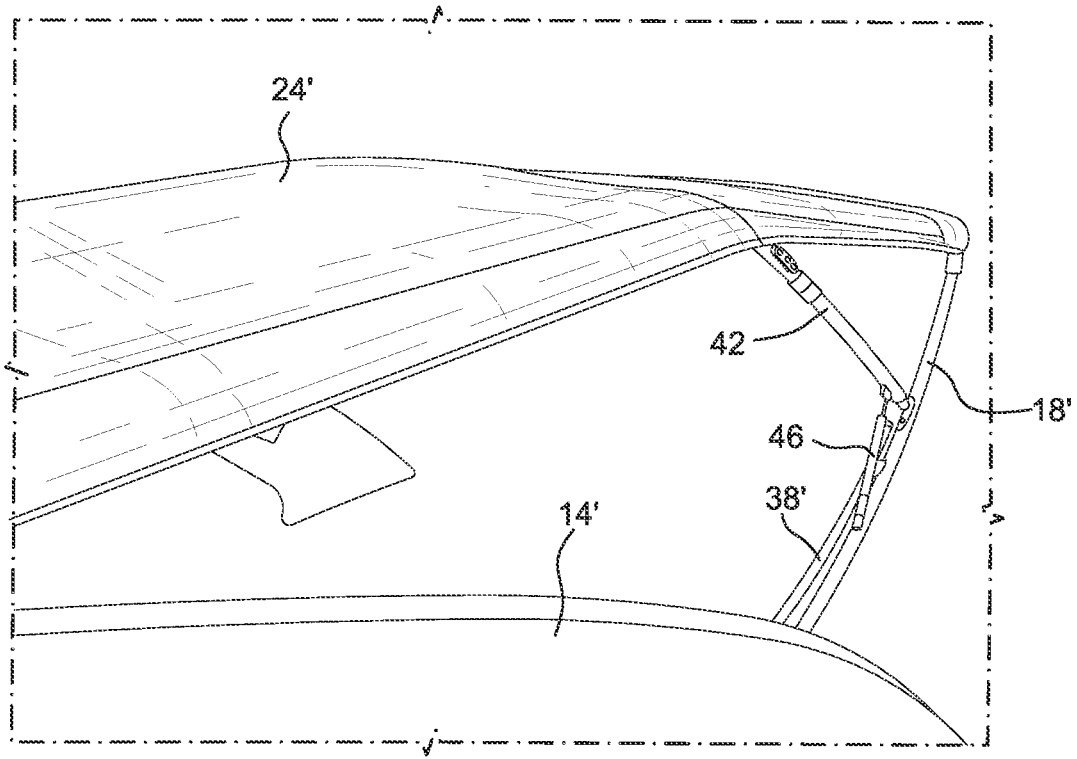
FIG. 9 is an elevated view of the system of FIG. 7 showing the canopy arm, secondary canopy arm, and spring.
Figure 10:
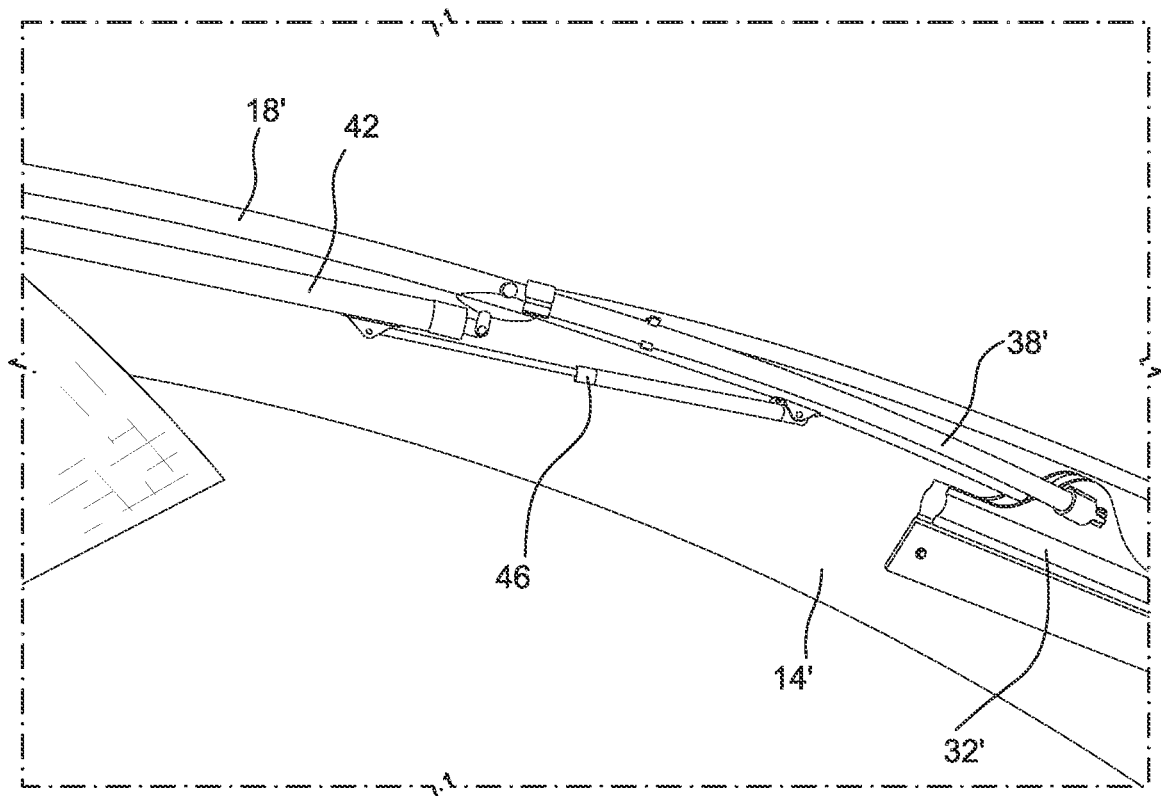
FIG. 10 is a perspective view of the canopy arm, secondary canopy arm, and spring in the fully retracted position.

The canopy extension system 10' also includes a secondary canopy arm 42 that is pivotally connected to the canopy arm 18'. As seen in FIG. 7, the secondary canopy arm 42 is pivotally attached at approximately the midpoint of canopy arm 18' and is also attached at approximately the midpoint of the length of the canopy 24'. In other embodiments, the secondary canopy arm 42 may be modified to attach in other suitable locations for supporting the canopy 24'.

The secondary canopy arm 42 preferably consists of a metal U-shaped hoop that is similar in construction to the canopy arm 18'. The secondary canopy arm 42 may connect to the canopy 24' via a zipper system similar to zipper system 33' as described previously at the distal end of the canopy 24'. A spring 46 may be pivotally connected between the canopy arm 18' and secondary canopy arm 42 for biasing the secondary canopy arm 42, as will be described below. As shown in FIGS. 7-11, the spring is preferably a gas strut, but may be any other suitable biasing mechanism.

Figure 11:
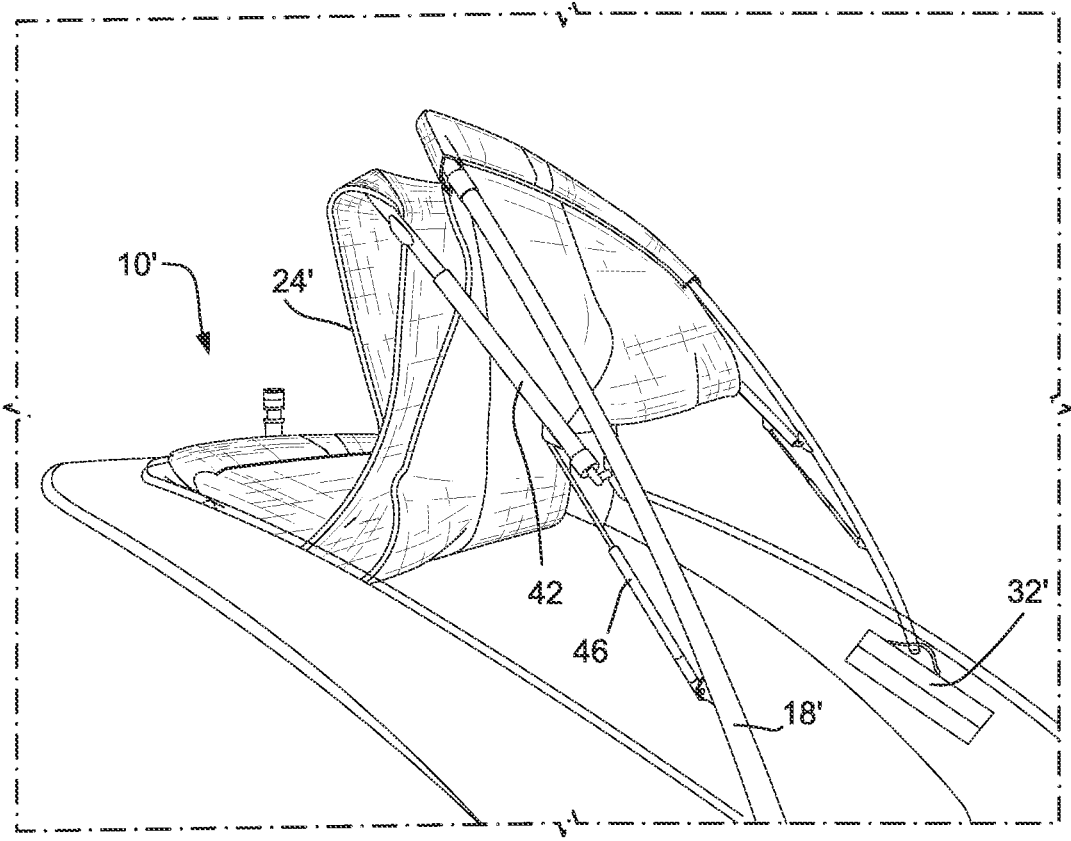
FIG. 11 shows the system of FIG. 7 in an interim position between the retracted position and the extended position.

When the canopy extension system 10' is extended, the drive mechanism 32' actuates the canopy arm 18' towards the extended position. Once the proximal end of the canopy 24' begins to become taut between the radar arch top 16' and the secondary canopy arm 42, the spring 46 biases the secondary canopy arm 42 to remain in position as the canopy arm 18' is actuated into the fully-extended position. As seen in FIG. 11, the spring 46 compresses at an end that is pivotally attached to the secondary canopy arm 42 to provide a biasing force to maintain the secondary canopy arm 42 in the extended position.

Figure 12:
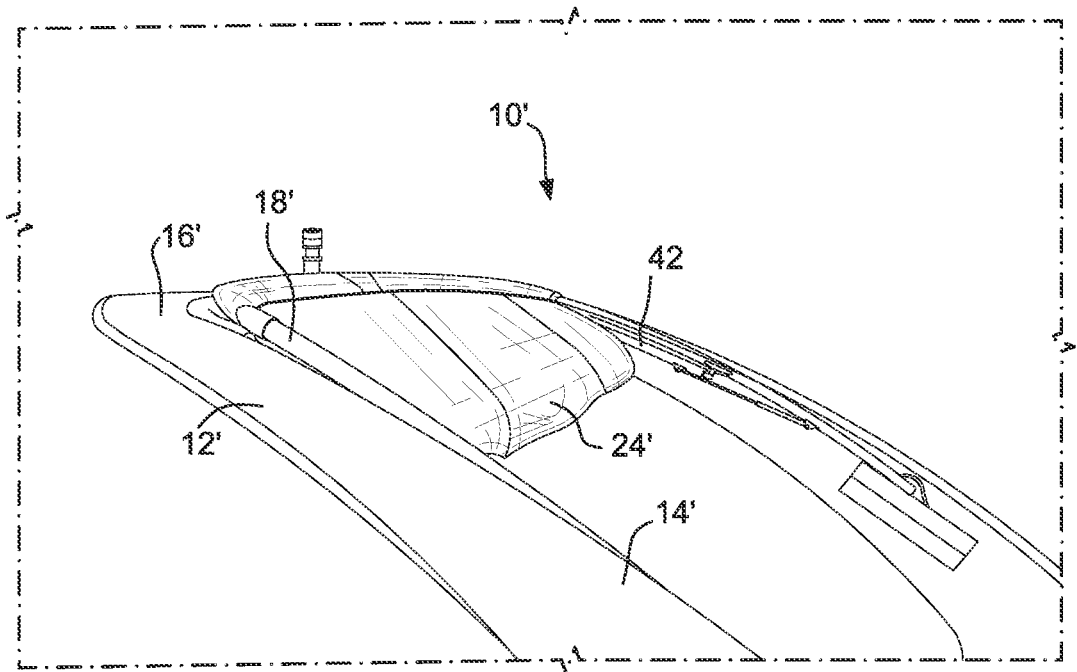
FIG. 12 shows the system of FIG. 7 in a fully retracted position.

Once the canopy 24' is in the fully extended position and is taut between the radar arch top 16' and the canopy arm 18', one or more struts 38' that are selectively connectable between the canopy arm 18' and the secondary canopy arm 42 may be deployed. The struts 38' function and are stowed in a manner similar to struts 38 described previously. When retracting, the struts 38' are stowed and the canopy arm 18' is actuated towards the retracted position. As the canopy arm 18' retracts, the spring 46 (e.g., gas strut) extends to bias the secondary canopy arm 42 into the retracted position. In the fully retracted position, the canopy 24' drapes downward from the arms to be gathered and placed in a boot for storage (not shown). As seen in FIG. 12, the canopy arm 18' and the secondary canopy arm 42 may be curved to lay adjacent the radar arch legs 14' and may rest on top of each other to nest slightly within the opening of the radar arch 12'.

The bimini arch canopy extension system similarly creates an extended canopy that provides shade for a greater area on a boat deck. A greater area can be covered by securing the spring-biased secondary canopy arm at a midpoint of the canopy so that the extra-long canopy is supported and tensioned as the system is actuated to an extended position. The secondary canopy arm is biased into the retracted position as the canopy is stowed.

FIGS. 15-17 show another alternate embodiment of a canopy extension system 10" secured on a radar arch 12". As mentioned with the previous embodiments, the canopy extension system 10" could be cooperable with alternative support structures. The radar arch 12" includes a pair of radar arch legs 14" securable on a cabin or boat deck. A radar arch top 16" extends from ends of the pair of radar arch legs 14".

The canopy extension system 10" includes a canopy arm 18" pivotably secured to the radar arch legs 14" (or other support structure). The canopy arm 18" may be pivotally connected to the radar arch legs 14" via drive mechanism 32" on at least one arch leg. The drive mechanism 32" is coupled with at least one end of the canopy arm 18", preferably both, and is configured to displace the canopy arm 18" between retracted and extended positions. The drive mechanism 32" is similar to the drive mechanism 32 described in respect of the first embodiment.

A canopy 24" is connected to the canopy arm 18" at a distal end of the canopy 24" and is connected adjacent the radar arch 12" at a proximal end of the canopy 24". The proximal end of the canopy 24" may be attached to the structure by any suitable method. In some embodiments, the proximal end of the canopy 24" is connected to a fixed bar 26" secured across a top portion of the radar arch legs 14". The distal end of the canopy 24" may be connected to the canopy arm 18" by a zipper system 33 as described previously.

The canopy extension system 10" also includes a secondary canopy arm 42" that is pivotally connected to the canopy arm 18" and is similar to the secondary canopy arm 42. A roller 22" is secured on the secondary canopy arm 42". The roller 22" functions similarly to roller 22. The roller 22" may be secured to the secondary canopy arm 42" in any suitable manner. In the embodiment shown, the roller 22" may be connected to the secondary canopy arm 42" such that the roller 22" may rotate with the rolling or unrolling of the canopy 24" independently from the pivotal movement of the secondary canopy arm 42" on either side of the roller 22".

The canopy 24" may be provided with an integrated bead 28 (FIG. 4) received in a receiving aperture 30 in the roller 22" as previously discussed.

The canopy extension system 10" may also include one or more struts 38" that are selectively connectable between the secondary canopy arm 42" and the radar arch leg 14" or other supporting structure when the secondary canopy arm 42" is pivoted to the extended position. The radar arch 12" may be provided with a clip 40" or the like, where the strut 38" is detachable from the secondary canopy arm 42" and securable to the radar arch leg 14" via the clip 40". The struts 38" can be secured to the secondary canopy arm 42" in the retracted position, and the struts 38" may be released from the clip 40" and rotated into engagement with the radar arch leg 14" to help support the secondary canopy arm 42" when the system is in the extended position. In this embodiment, a distal end of the struts 38" may contain a knob or another locking feature that snaps into a receiving feature integrated into the radar arch leg 14" spaced vertically adjacent the location of the roller 22". When retracting the system, the struts 38" are released from the radar arch leg 14" and returned to the clips 40" on the secondary canopy arm 42".

The roller 22" is preferably spring-biased so that as the system is displaced from the extended position toward the retracted position, the roller 22" rolls up the canopy 24" from both ends by action of the spring. The roller 22" attaches to a midpoint of the canopy 24". FIG. 17 shows the system in a position between the retracted position and the extended position. As the drive mechanism 32" begins to pivot the canopy arm 18", the distal end of the canopy 24" unrolls off the roller 22" and begins to pull the secondary canopy arm 42" toward the extended position. The secondary canopy arm 42" begins to pivot away from the canopy arm 18" and is suspended by the canopy 24" between the canopy arm 18" and the radar arch 12". The canopy 24" is rolled onto and off the roller 22" in both directions, as previously described. As the canopy arm 18" continues to be actuated and extended, the canopy 24" continues to unroll in both directions, and the secondary canopy arm 42" with the roller 22" continues to pivot away from the canopy arm 18" and is supported around a midpoint of the elongating canopy. This continues until the canopy 24" is fully extended as shown in FIG. 15 in a flat singular layer that is tensioned between the fixed bar 26" at the proximal end of the canopy and the canopy arm 18" at the distal end of the canopy 24". When retracting the system, since the roller 22" is spring-loaded, the roller 22" rotates to roll both sides of the canopy 24" onto the roller 22". The retraction continues and actuates the canopy arm 18" rearward and pivots the secondary canopy arm 42" back towards the canopy arm 18" until they return to the retracted position.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A canopy extension system cooperable with a support structure, the canopy extension system comprising:
  a primary canopy arm securable pivotably to the support structure;
  a secondary canopy arm pivotably secured to the primary canopy arm;
  a spring connected between the primary canopy arm and the secondary canopy arm; and
  a canopy connected to the primary canopy arm at a distal end, connected adjacent the support structure at a proximal end, and connected to the secondary canopy arm between the distal end and the proximal end,
  wherein the spring acts between the primary canopy arm and the secondary canopy arm such that when the primary canopy arm is extended, the spring is configured to bias the secondary canopy arm toward an extended position, and when the primary canopy arm is retracted, the spring is configured to extend and bias the secondary canopy arm toward a retracted position.

2. A canopy extension system according to claim 1, wherein the secondary canopy arm is pivotably secured to the primary canopy arm at or near a midpoint of the primary canopy arm.

3. A canopy extension system according to claim 2, wherein the spring is connected to the primary canopy arm between the midpoint of the primary canopy arm and the support structure, and wherein the spring is connected to the secondary canopy arm at a position spaced from where the secondary canopy arm is secured to the primary canopy arm.

4. A canopy extension system according to claim 2, wherein the secondary canopy arm is connected to the canopy at or near a midpoint of a canopy length.

5. A canopy extension system according to claim 1, wherein the secondary canopy arm comprises a U-shaped hoop connected at ends thereof to the support structure and connected in a middle thereof to the canopy.

6. A canopy extension system according to claim 1, further comprising a drive mechanism coupled with the primary canopy arm and configured to displace the primary canopy arm between a retracted position and an extended position.

7. A canopy extension system according to claim 6, wherein the drive mechanism is motorized.

8. A canopy extension system according to claim 1, further comprising a fixed bar securable to the support structure, wherein the proximal end of the canopy is connected to the fixed bar.

9. A canopy extension system according to claim 1, further comprising a strut that is selectively connectable between the primary canopy arm and the secondary canopy arm when the primary canopy arm is pivoted to an extended position.

10. A canopy extension system according to claim 9, wherein the primary canopy arm comprises a clip, and wherein an end of the strut is detachable from the secondary canopy arm and securable to the primary canopy arm via the clip.

11. A canopy extension system according to claim 1, wherein when the primary canopy arm is disposed in a fully retracted position, the canopy drapes downward from the primary and secondary canopy arms to be gathered for storage.

12. A radar arch in combination with a canopy extension system comprising:
  a pair of radar arch legs securable on a cabin;
  a radar arch top extending from ends of the pair of radar arch legs;
  a primary canopy arm pivotably secured to the radar arch legs;
  a secondary canopy arm pivotably secured to the primary canopy arm;
  a spring connected between the primary canopy arm and the secondary canopy arm; and
  a canopy connected to the primary canopy arm at a distal end, connected adjacent the radar arch at a proximal end, and connected to the secondary canopy arm between the distal end and the proximal end, wherein the spring acts between the primary canopy arm and the secondary canopy arm such that when the primary canopy arm is extended, the spring is configured to bias the secondary canopy arm toward an extended position, and when the primary canopy arm is retracted, the spring is configured to extend and bias the secondary canopy arm toward a retracted position.

13. A radar arch and canopy extension system according to claim 12, wherein the radar arch legs are curved, and wherein the primary canopy arm is curved corresponding to the radar arch legs.

14. A radar arch and canopy extension system according to claim 13, wherein the secondary canopy arm is curved corresponding to the radar arch legs.

15. A radar arch and canopy extension system according to claim 12, further comprising a fixed bar securable to the radar arch legs, wherein the proximal end of the canopy is connected to the fixed bar.

16. A radar arch and canopy extension system according to claim 12, further comprising a drive mechanism connected to each of the radar arch legs and coupled with the primary canopy arm, the drive mechanism configured to displace the primary canopy arm between a retracted position and an extended position.

17. A radar arch and canopy extension system according to claim 16, wherein the drive mechanism is motorized.

18. A canopy extension system attachable to a radar arch, the canopy extension system comprising:

a primary canopy arm pivotably secured on the radar arch;

a secondary canopy arm pivotably secured on one of the radar arch and the primary canopy arm, wherein the primary canopy arm and the secondary canopy arm are pivotable together between a retracted position and an extended position;

a fixed bar secured to the radar arch;

a canopy connected between the fixed bar and the primary canopy arm through the secondary canopy arm; and a motorized drive system connected to the primary canopy arm and configured to displace the primary canopy arm and the secondary canopy arm between the retracted position and the extended position, wherein the secondary canopy arm comprises a roller arm pivotably secured to the primary canopy arm, the canopy extension system further comprising a roller secured on the roller arm, wherein the canopy is connected between the fixed bar and the primary canopy arm through the roller.

* * * * *